(12) United States Patent
Wattenhofer et al.

(10) Patent No.: US 8,806,000 B1
(45) Date of Patent: Aug. 12, 2014

(54) IDENTIFYING VIRAL VIDEOS

(75) Inventors: Mirjam Wattenhofer, Gockhausen (CH); Tom Broxton, Zurich (CH); Anders Brodersen, Wädenswil (CH); Jonas Yngvesson, Binz (CH); Jakub Petrykowski, Zurich (CH)

(73) Assignee: Google Inc., Mountain View, CA (US)

( * ) Notice: Subject to any disclaimer, the term of this patent is extended or adjusted under 35 U.S.C. 154(b) by 895 days.

(21) Appl. No.: 12/981,405

(22) Filed: Dec. 29, 2010

Related U.S. Application Data

(60) Provisional application No. 61/365,260, filed on Jul. 16, 2010.

(51) Int. Cl.
*G06F 15/173* (2006.01)

(52) U.S. Cl.
USPC .................................................. 709/224

(58) Field of Classification Search
CPC ....... H04L 12/588; H04L 51/32; H04L 29/06; H04L 43/00; H04L 12/2602
See application file for complete search history.

(56) References Cited

U.S. PATENT DOCUMENTS

| 8,151,194 | B1* | 4/2012 | Chan et al. ............... | 715/716 |
| 8,566,315 | B1* | 10/2013 | Davtchev et al. ............ | 707/736 |
| 8,650,488 | B1* | 2/2014 | Wattenhofer et al. ......... | 715/719 |
| 2010/0211432 | A1* | 8/2010 | Yiu et al. ................ | 705/10 |
| 2011/0078718 | A1* | 3/2011 | Jakobi et al. ............. | 725/14 |
| 2011/0239103 | A1* | 9/2011 | Mercuri ................. | 715/234 |

OTHER PUBLICATIONS

Clingerman et al. "The Rise of Viral Videos"—2013—pp. 1-25.*
Jiang et al. "Viral Video Stype: A closer look at Viral Video on Youtube" pp. 1-8.*
Broxton et al. "Catching Viral Video" 2011—pp. 1-19.*
Soysa et al. "Predicting YouTube Content Popularity via face book data : A newtork spread model for optimizing multimeda delivery"—2013 IEEE—Pae 1-8.*

* cited by examiner

*Primary Examiner* — Oscar Louie
*Assistant Examiner* — Younes Naji
(74) *Attorney, Agent, or Firm* — Fenwick & West LLP

(57) ABSTRACT

The present invention enables methods and systems that identify viral videos. A viral video is a video which received a percentage of its views from one person sharing the video with another person. That is, a viral video received most of its views from person to person sharing. A video hosting server determines whether a video is a viral video based at least in part on views the video received through person to person sharing and the total number of views the video has received.

27 Claims, 4 Drawing Sheets

IDENTIFYING VIRAL VIDEOS

CROSS-REFERENCE TO RELATED APPLICATIONS

This application claims the benefit of U.S. Provisional Application 61/365,260, filed on Jul. 16, 2010, which is incorporated by reference herein in its entirety.

TECHNICAL FIELD

The present invention generally relates to identifying videos for display. Particularly, the present invention relates to identifying viral videos.

BACKGROUND

Historically videos have been provided to consumers by very large media organizations, and consumer choices have been limited to watching the videos offered by those media organizations or turning off the television. Today, with the emergence of online video sharing and social networking websites, the manner in which people consume videos has fundamentally changed. Instead of passively watching videos that are selected, created, and distributed by a media organization, such as a television network, users have the ability to choose and watch videos that are selected from among a much larger and broader set of video content. However, the sheer volume of available videos often makes it difficult for users to decide what videos to watch.

Accordingly, people have increasingly relied on their social networks to help them find interesting videos to watch. This sharing of videos through web sites, blogs, email, and other means has given rise to a new phenomenon—that of viral videos. Unlike traditional videos, a viral video's success is not dependent on the size of the company behind the video or the amount of money spent on the video's promotion. Rather, a viral video's success is dependent on the users that share the video with others. Accordingly, prediction of viral videos is difficult due to the nature of discovery of videos that become viral.

SUMMARY

The present invention enables methods and systems for identifying viral videos. In one embodiment, a viral video is a video for which a predetermined percentage of its views result from person to person sharing. According to one embodiment, a video hosting server determines whether a video is a viral video based at least in part on a ratio of social views a video has received to the number of total views the video has received. Responsive to the ratio being above a threshold, the video is determined by the video hosting server to be a viral video.

The features and advantages described in this summary and the following detailed description are not all inclusive. Many additional features and advantages will be apparent to one of ordinary skill in the art in view of the drawings, specification and claims.

The figures depict a preferred embodiment of the present invention for purposes of illustration only. One skilled in the art will readily recognize from the following discussion that alternative embodiments of the structures and methods illustrated herein may be employed without departing from the principles of the invention described.

DETAILED DESCRIPTION

System Overview

Figure 1:
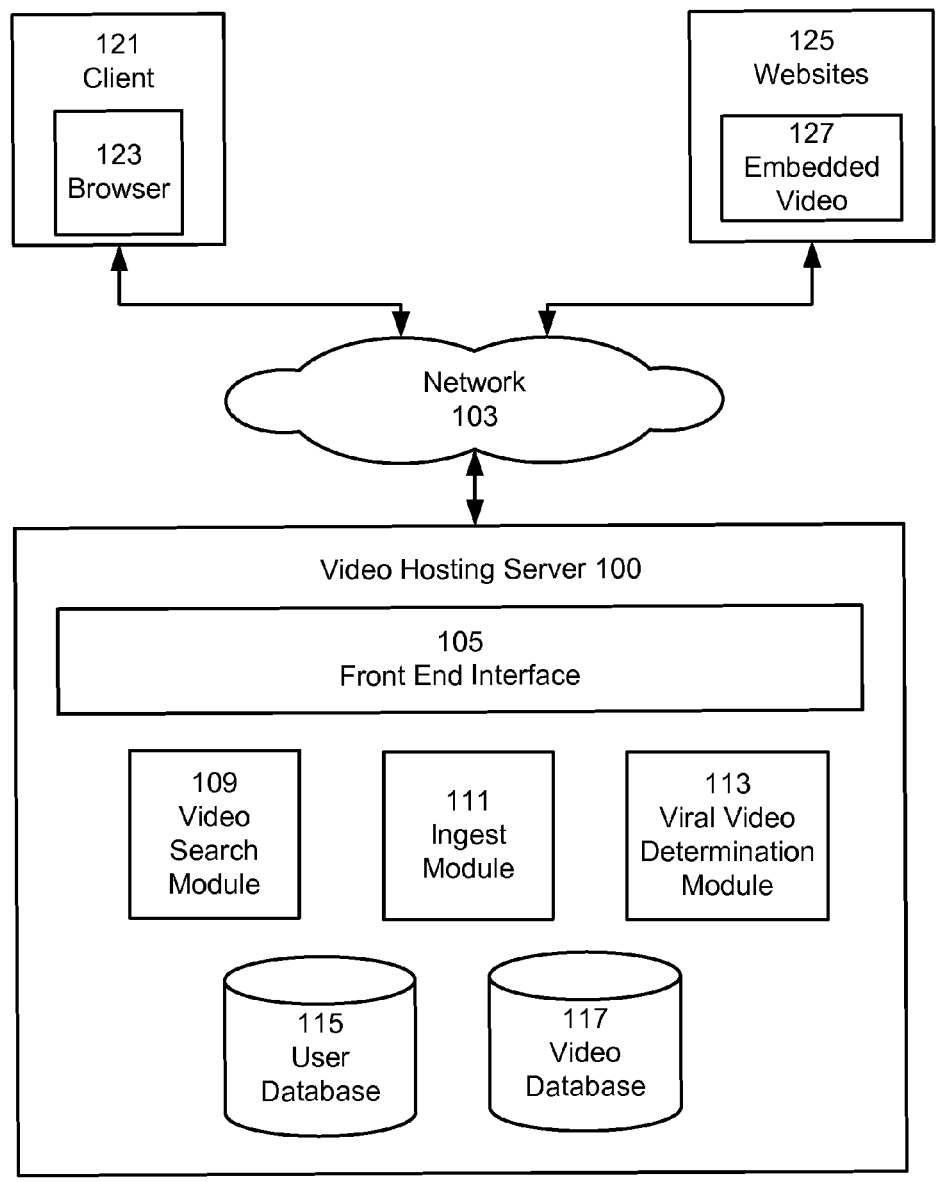
FIG. 1 is a system architecture of a video hosting system in accordance with one embodiment.

FIG. 1 illustrates a system architecture of a video hosting server 100 in accordance with one embodiment of the present invention. Generally, the video hosting server 100 hosts uploaded media content (e.g., videos) for display to users. In one embodiment, the video hosting server 100 identifies a viral video from the uploaded videos as a video that received a high number of views that were mostly from person-to-person sharing such as through email messages, instant messages, blog posts, or media-sharing websites.

Although sharing is important, not all highly social videos become viral, and not all popular videos are highly social. The video hosting server 100 determines videos that are in the top "X" percentile in terms of social views received during the first "Y" days from the video being uploaded. A percentage of these videos relied heavily on social views in becoming popular and can thus be classified as viral videos In one embodiment, the "socialness" of a video is quantified by classifying the referrer sources for video views as "social" (e.g., an emailed link) or "non-social" (e.g., a promoted video link on the video hosting server 100). By segmenting videos according to their social views, the video hosting server 100 determines that highly social videos behave differently than less social videos. In particular, the highly social videos rise to, and fall from, their peak popularity more quickly. Initially, these videos also tend to generate more views than less social videos, although this advantage decreases as time goes on.

As shown in FIG. 1, the video hosting server 100 includes a front end interface 105, a video search module 109, an ingest module 111, a viral video determination module 113, a user database 115, and a video database 117. Many conventional features, such as firewalls, load balancers, application servers, failover servers, site management tools and so forth are not shown so as not to obscure the features of the system.

In one embodiment, a suitable website for implementation of the video hosting server 100 is the YOUTUBE™ website, found at www.youtube.com. Other video hosting sites are known as well, and can be adapted to operate according to the teaching disclosed herein. It will be understood that the term "website" represents any computer system adapted to serve content using any networking protocol, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

In one embodiment, the video hosting server 100 is implemented as server program executing on server-class computer comprising a CPU, memory, network interface, peripheral interfaces, and other well known components. In one embodiment, the computers themselves run an operating system such as LINUX, Microsoft Windows, or Mac OS X, have generally high performance CPUs, 2G or more of memory, and 1TB or more of disk storage. Of course, other types of computers can be used, and it is expected that as more powerful computers are developed in the future, they can be configured in accordance with the teachings here. The functionality implemented by any of the elements can be provided by computer program products (e.g., as computer executable instructions) that are stored in non-transitory computer-readable storage mediums (e.g., RAM, hard disk, or optical/magnetic media).

In one embodiment, and as shown in FIG. 1, a client 121 executing a browser 123 connects to the video hosting server 100 to view media content, herein referred to as a "video," "video content" or "video items" via a network 103 such as the Internet or any combination of a LAN, a MAN, a WAN, a mobile, wired or wireless network, a private network, or a virtual private network. While only a single client 121 and browser 123 is shown in FIG. 1, in general very large numbers (e.g., millions) of clients are supported and can be in communication with the video hosting server 100 at any time. In one embodiment, the client 121 can be implemented using any of a variety of different computing devices, some examples of which are personal computers, digital assistants, personal digital assistants, cellular phones, mobile phones, smart phones and laptop computers.

The browser 123 may include any application that allows users of clients 121 to access web pages on the World Wide Web. Suitable applications include, but are not limited to GOOGLE CHROME, MICROSOFT INTERNET EXPLORER, NETSCAPE NAVIGATOR, MOZILLA FIREFOX, and APPLE SAFARI. The browser 123 can also include a video player (e.g., Flash™ from Adobe Systems, Inc.), or any other media player adapted to play one or more videos hosted on video hosting server 100. Alternatively, videos can be accessed by a standalone program separate from the browser 123, such as Apple QuickTime, Microsoft Media Player, or other applications designed for media playback.

The browser 123 allows the user of client 121 to access videos from the video hosting server 100 via a user interface provided by the front end interface 105. Through the interface, a user can locate videos hosted on video hosting server 100 by browsing a catalog of videos, conducting keyword searches, reviewing video lists provided by other users or the system administrator (e.g., collections of videos forming channels), or by reviewing videos associated with particular user groups (e.g., communities). The browser 123 also enables a user to access a video indirectly, for example, via an embedded hyperlink in an email message or through a third party website 125.

Users can search for videos hosted on the video hosting server 100 based on keywords, tags or other metadata. In one embodiment, search requests received by the front end interface 105 are provided to the video search module 109, which searches the video database 117 for videos that satisfy the search request. The video search module 109 supports searching on any data field that is associated with a video stored in database 117. Such data fields can include, for example, a video's title, description, tags, author, category, comment, and so forth. In one embodiment, the metadata that video database 117 associates and stores with videos include a video identifier (ID), a viral video indicator, artist, title, label, genre, time length, and optionally viewing restrictions.

In one embodiment, the user database 115 stores a record of all users viewing videos provided by the video hosting server 100. In one embodiment, the user database 115 stores a record of all users who have registered an account with the video hosting server 100. Each registered account includes at least a user name and e-mail address associated with the account. A registered account may also include information about the user associated with the account such as their name, hobbies, uploaded videos and/or favorite videos.

In one embodiment, for users who have not registered an account with the video hosting server 100, each individual user is assigned a user ID, for example, based on his or her IP address to differentiate the individual users. This user ID is in one embodiment an anonymized user ID that is assigned to each individual user to keep user identities private.

In one embodiment, the browser 123 also allows users to upload videos to the video hosting server 100 through the front end interface 105. In one embodiment, the uploaded videos provided by users are processed by an ingest module 111 at the video hosting server 100 for storage in the video database 117. The processing can include video format conversion (transcoding), compression, metadata tagging, as well as other data processing. The ingest module 111 processes the videos in order to standardize content for playback to users of client 121. In particular, transcoding the videos from one format to another enables the video hosting server 100 to receive uploaded videos of various formats, and to provide the videos in a standardized output format to users of client 121. Once uploaded videos have been formatted, the ingest module 111 stores the videos.

In some embodiments, users may upload digital content other than videos to the hosting server 100. The uploaded digital content may be a still image, such as a JPEG or GIF file, a text file, or an audio file. For convenience, uploaded digital content will be referred to herein as a "video," "video files," or "video items," regardless of the type of digital content uploaded, and no limitation on the type of digital content should be inferred from this terminology. Thus, the operations described here for determining viral videos may be applied to other types of digital content such as audio files (e.g. music, podcasts, audio books, and the like), documents, websites, images, multimedia presentations, and so forth.

In one embodiment, the viral video determination module 113 determines a video to be a viral video based on the number of social views of the video relative to the total number of views received by the video. This determination can be based on the number of views received by the video within a given period of time.

In one embodiment, viral video determination module 113 determines a view of a video to be a social view based on the nature of the source that referred the video to the viewer. For example, a viewer can be referred to a video from any of the following sources:

External and Embeds: A user viewed a video as a result of selecting a link that is external to the website provided by the video hosting server 100. The link may be included in blog posts, email messages, instant messages, etc. Also, the view may be of a video that was directly embedded into a blog post, email message, or website, thereby allowing the user to watch the video without being redirected to the website that is provided by the video hosting server 100.

Unknown or Direct Link: The user typed or copied a URL directly into the browser. The nature of the source that referred the user to the video is therefore unknown.

Search Results: The user located the video from search results provided by a search engine running on the video hosting server 100 or by an external search engine.

Internal Links—The user located a video using links provided by the video hosting server 100. Such links can be provided, for example, in a related videos section, in a featured videos section, and in video ads and promotions provided by the video hosting server 100.

In one embodiment, only views resulting from external links, embeds, and unknown or direct links are considered social views because these views are the result of person-to-person sharing. For example, a user may embed a video in a blog post or include a link to the video in the blog post, which results in other users watching the video. Thus, the video was distributed from the owner of the blog post to other users (i.e., person-to-person sharing). Alternatively, a user may email a URL link of a video to his or her friend, which results in the user's friend viewing the video. The video may be viewed either by clicking on the emailed link, or by the person copying the link and pasting it into the browser 123 for viewing. These views are also considered social views since the video was viewed as a result of one person sharing the video with another person. In contrast, views that result from search result links or internal links are not considered social views since they are not the result of person to person sharing.

Viral Video Identification Process

Figure 2:
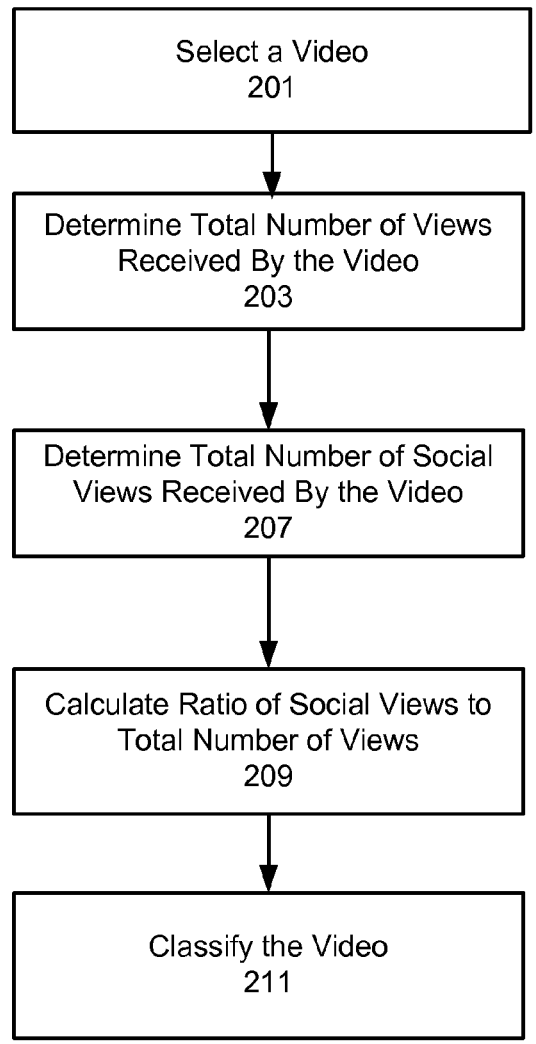
FIG. 2 illustrate a method for determining viral videos in accordance with one embodiment.

Referring now to FIG. 2, there is shown one embodiment of the viral video identification process performed by the viral video determination module 113. In one embodiment, the viral video determination module 113 selects 201 a video for analysis. For example, the viral video determination module 113 identifies a video having at least k views as suitable for analysis. That is, the viral video determination module 113 identifies a video that has received a number of views above a threshold number of views, such as more than 5,000 views as suitable for analysis.

In alternative embodiments, the video for analysis may be selected based on the upload dates of the video in addition to the number of views. Generally, the phenomenon of viral videos has coincided with the popularity of social networking sites, which facilitate the sharing of videos. Thus, viral video determination module 113 can identify the video for analysis a video that was uploaded between the dates when social networking sites became widely used until the present day. By restricting the selection of the video to a video that was uploaded within a restricted time frame, the number of videos stored in the video database 117 that need to be analyzed can be greatly reduced.

The viral video determination module 113 determines 203 the total number of views that the video received. The viral video determination module 113 then determines 207 the total number of social views received by the video. For each view of each video, the viral video determination module identifies the source that referred the video to the viewer, and whether the source is a social source indicative of a social view. In particular, the viral video determination module 113 can determine that the source that referred the video to the viewer was a social source by determining that the video was viewed through an external link, an embedded link, or an unknown/direct link.

In one embodiment, the viral video determination module 113 may determine the originating source of a view of a video from a HTTP referrer included in a HTTP header field in a request for the video. The request may be initiated due to a selection of a link to the video that is included in a web page. The HTTP referrer indicates the web page from which the link was followed to view the video. Thus, when a person views the video, the viral video determination module 113 analyzes the HTTP referrer to determine the source of the video. The viral video determination module 113 considers any views that were referred from outside of the website provided by the video hosting server 100 to be a social view. For example, for views resulting from selection of a video link in a web page external to the video hosting server 100, the HTTP referrer indicates the website that hosts the web page is a social source. Thus, any views originating from the social source are social views. In contrast, any views of videos resulting from internal search results of the video hosting server 100 results in the HTTP referrer indicating that the video hosting server 100 provided the view of the video. Accordingly, the source for the video is a non-social source indicative that the views are non-social views.

Alternatively, the viral video determination module 113 determines the origin of a view by analyzing HTML tags included in a link that lead to the view of a video hosted by the video hosting server 100. The viral video determination module 113 may analyze the "feature" parameter in a URL link, for example, to determine the source of a viewing of a video. For example, consider a video embedded in a web page external to the video hosting server 100. The embedded video is linked to the video hosting server 100 by a URL that includes the parameter "feature=player_embedded." Because the video is embedded in an external web page, the source is a social source. Thus, views from the source are social views. In contrast, a view of a video resulting from a person clicking on a video in a "related videos section" of the website provided by the video hosting server may include the HTML parameter "feature=related" indicating that the source is a non-social source. Thus, the view originating from the source is a non-social view.

Next, the viral video determination module 113 calculates 209 the ratio of social views for the video (i.e., views referred through social sources or links) to the total number of views of the video. In one embodiment, the viral video determination module 113 classifies 211 the video based on the ration. The viral video determination module 113 identifies the video as a viral video if the ratio of social views to total views is above a predetermined threshold. For example, in one embodiment, if 60% or more of the total views of the video are identified as social views, the viral video determination module 113 classifies (i.e., categorizes) the video as a viral video. In one embodiment, the viral video determination module 113 may store its identification of a video as a viral video as metadata in the video database 113.

In an alternative embodiment, the viral video determination module 113 also analyzes social views of a video to determine how the number of social views changes over time. In that embodiment, the viral video determination module 113 can classify a video as a viral video responsive to a significant increase in the number of social views received by the video over a short time period (e.g., a day or a few hours). For example, the viral video determination module 113 may identify a significant spike in the amount of social views that a video received during a short time period such as the video receiving one million social views within a single day or within a few hours. The spike in viewership is indicative that the video is a viral video. According to one embodiment, viral video determination module 113 compares the increase (i.e., the difference) in the number of social views over time to a threshold to determine whether the video is a viral video. In response to the number of social views exceeding the threshold, the viral video determination module 113 classifies the video as a viral video.

In one embodiment, the viral video determination module 113 also determines which categories of videos are the most widely shared. For each viral video, the viral video determination module 113 determines a video category based on the content of the video. Generally, the content of the video can be determined from metadata that is associated with the video (e.g., as provided by the content owner). Once the category of each viral video is determined, the viral video determination module 113 can determine the number of viral videos in each category. The viral video determination module 115 can then rank the categories based on the number of viral videos in each category. The rank illustrates which categories of videos produce the most viral videos.

User Interfaces

Figure 3:
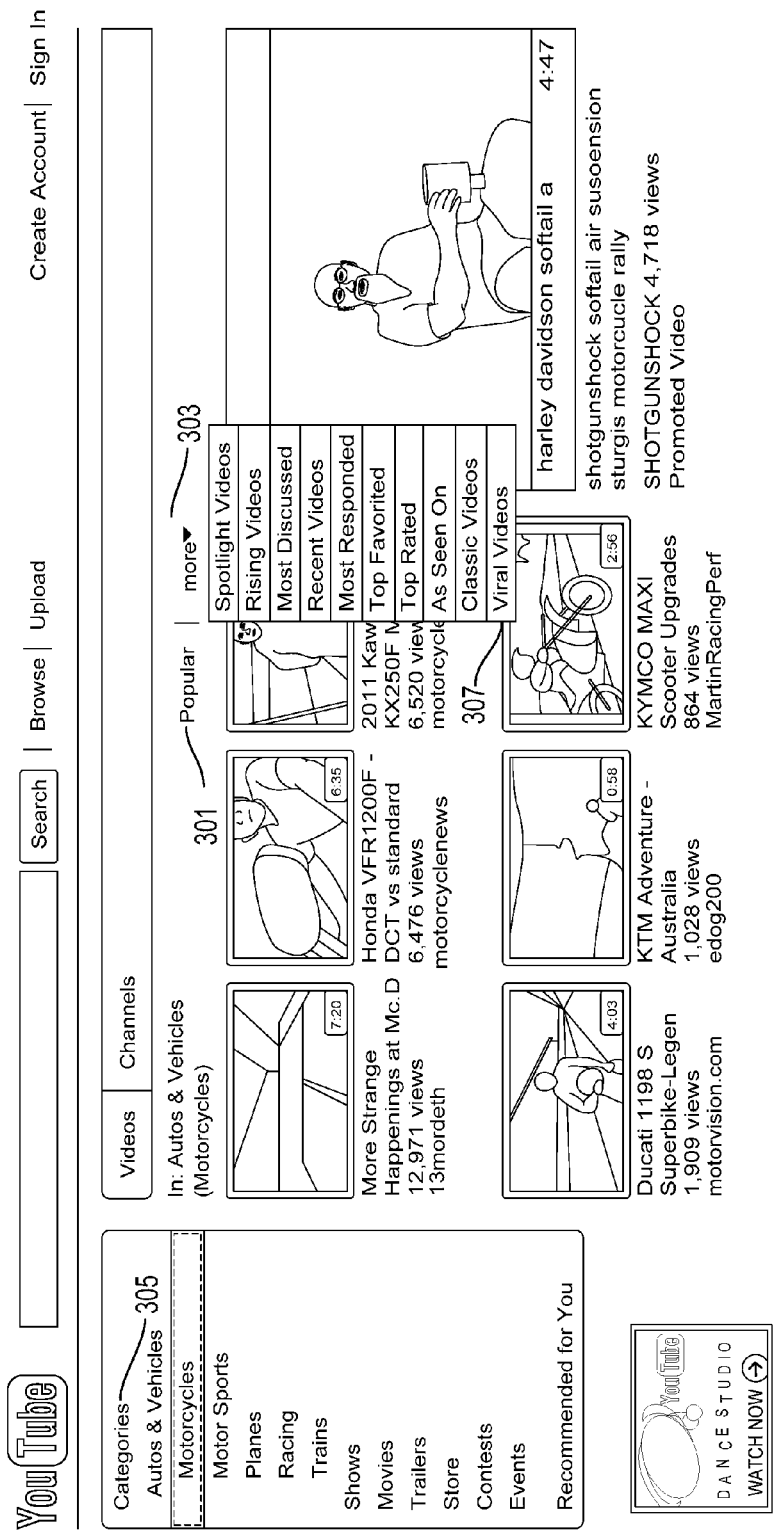
FIG. 3 illustrates a user interface for viewing viral videos, according to one embodiment.

Referring now to FIG. 3, there is shown one embodiment of a user interface to locate viral videos. In one embodiment, a user of client 121 may navigate to the website hosted by the video hosting server 100. The user of client 121 may browse through all of the different categories of videos 301 hosted by the server 100 as illustrated in FIG. 3. The user may also browse videos in the most viewed videos section (not shown) or view videos by content category 305.

In one embodiment, to view viral videos, the user selects a drop down list 303 to display more information about videos in a particular category. The drop down list can include an item to display viral videos in the selected category. Responsive to receiving a selection of the viral videos item 307 in the drop down list 303, the video hosting server 100 displays a list of viral videos in the selected category to the user, and the user selects one of the viral videos from the list to view.

Figure 4:
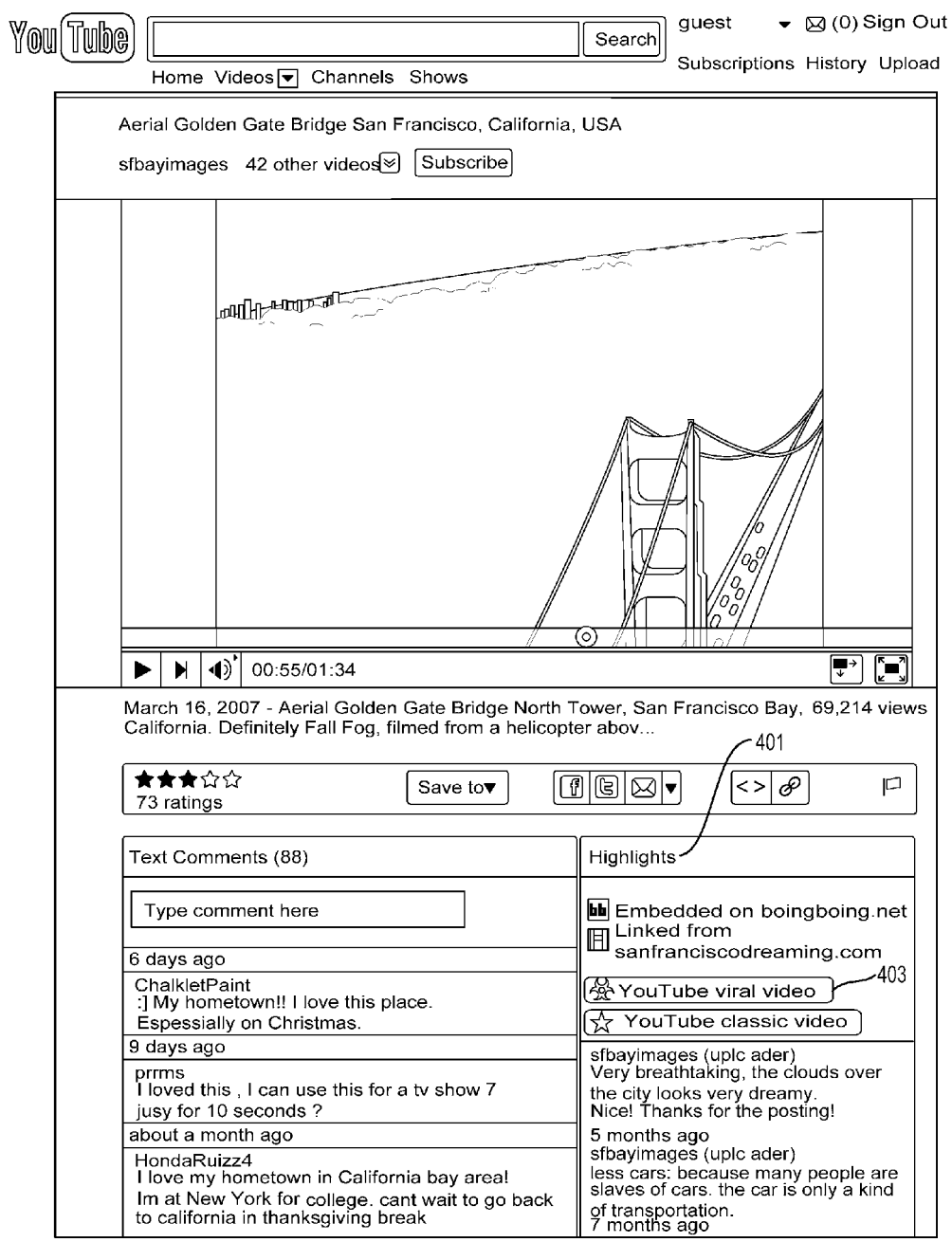
FIG. 4 illustrates a view page of a viral video, according to one embodiment.

Referring now to FIG. 4, in one embodiment, the video hosting server can provide an indication to the viewer that a video has been tagged as a viral video in a viewing page of the video. As shown in the figure, in the highlight section 401 of the video, a viral video indication 403 is shown to indicate to the viewer that the video is a viral video in the highlight section 401 on the viewing page of the video.

Reference in the specification to "one embodiment" or to "an embodiment" means that a particular feature, structure, or characteristic is included in at least one embodiment of the invention. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for identifying a viral video hosted on a video hosting website, the method comprising:
    determining a set of views received by the video;
    classifying, for each of the views in the set, a source that referred the video to a viewer as either a social source or a non-social source;
    determining a ratio of a total number of views of the video that were referred to the viewer by social sources to a total number of views in the set of views received by the video; and
    identifying the video as a viral video in response to the ratio exceeding a ratio threshold.

2. The computer-implemented method of claim 1, further comprising:
    selecting the video based on a total number of views received by the video exceeding a threshold total number of views.

3. The computer-implemented method of claim 1, wherein the source that referred the video to a viewer is classified as a social source in response to determining that a reference to the video was provided to the viewer.

4. The computer-implemented method of claim 3, wherein the reference comprises a uniform resource locator (URL).

5. The computer-implemented method of claim 1, wherein the source that referred the video to a viewer is classified as a social source in response to determining that the video was embedded on a web page of a third party website.

6. The computer-implemented method of claim 1, wherein the source that referred the video to a viewer is classified as a social source in response to determining that a link to the video was sent in an email message.

7. The computer-implemented method of claim 1, wherein the source that referred the video to a viewer is classified as a social source in response to determining that a nature of the source is indeterminate.

8. The computer-implemented method of claim 1, wherein the source that referred the video to a viewer is classified as a non-social source in response to determining that a reference to the video was provided by a search engine.

9. The computer-implemented method of claim 1, wherein the source that referred the video to a viewer is classified as a non-social source in response to determining that a reference to the video was provided on a webpage of a video hosting website.

10. The computer-implemented method of claim 1, further comprising: updating metadata associated with the video indicating that the video is a viral video responsive to identifying the video as a viral video.

11. The computer-implemented method of claim 1, further comprising: displaying on a view page of the video an indication that the video is a viral video.

12. A computer program product comprising a non-transitory computer-readable storage medium containing computer program code for controlling a processor to perform a method for identifying a viral video hosted on a video hosting website, the method comprising:
    determining a set of views received by the video;
    classifying, for each of the views in the set, a source that referred the video to a viewer as either a social source or a non-social source;
    determining a ratio of a total number of views of the video that were referred to the viewer by social sources to a total number of views in the set of views received by of the video; and
    identifying the video as a viral video in response to the ratio exceeding a ratio threshold.

13. The computer program product of claim 12, wherein the source that referred the video to a viewer is classified as a social source in response to determining that a reference to the video was provided to the viewer.

14. The computer program product of claim 12, wherein the reference comprises a uniform resource locator (URL).

15. The computer program product of claim 12, wherein the source that referred the video to a viewer is classified as a social source in response to determining that the video was embedded on a web page of a third party website.

16. The computer program product of claim 12, wherein the source that referred the video to a viewer is classified as a social source in response to determining that a link to the video was sent in an email message.

17. The computer program product of claim 12, wherein the source that referred the video to a viewer is classified as a social source in response to determining that a nature of the source is indeterminate.

18. The computer program product of claim 12, wherein the source that referred the video to a viewer is classified as a non-social source in response to determining that a reference to the video was provided by a search engine.

19. The computer program product of claim 12, wherein the source that referred the video to a viewer is classified as a non-social source in response to determining that a reference to the video was provided on a webpage of a video hosting website.

20. A system for identifying a viral video hosted on a video hosting website, the system comprising:
    at least one server computer comprising a computer processor and a storage database comprising videos, the computer processor configured to execute instructions stored on a non-transitory computer-readable storage medium, the instructions when executed by the computer processor cause the processor to:
    determine a set of views received by the video;
    classify, for each of the views in the set, a source that referred the video to a viewer as either a social source or a non-social source;
    determine a ratio of a total number of views of the video that were referred to the viewer by social sources to a total number of views in the set of views received by the video; and
    identify the video as a viral video in response to the ratio exceeding a ratio threshold.

21. The system of claim 20, wherein the source that referred the video to a viewer is classified as a social source in response to determining that a reference to the video was provided to the viewer.

22. The system of claim 20, wherein the reference comprises a uniform resource locator (URL).

23. The system of claim 20, wherein the source that referred the video to a viewer is classified as a social source in response to determining that the video was embedded on a web page of a third party website.

24. The system of claim 20, wherein the source that referred the video to a viewer is classified as a social source in response to determining that a link to the video was sent in an email message.

25. The system of claim 20, wherein the source that referred the video to a viewer is classified as a social source in response to determining that a nature of the source is indeterminate.

26. The system of claim 20, wherein the source that referred the video to a viewer is classified as a non-social source in response to determining that a reference to the video was provided by a search engine.

27. The system of claim 20, wherein the source that referred the video to a viewer is classified as a non-social source in response to determining that a reference to the video was provided on a webpage of a video hosting website.

* * * * *